No. 629,395. Patented July 25, 1899.
W. D. SARGENT.
BEARING.
(Application filed Dec. 8, 1898.)
(No Model.) 2 Sheets—Sheet 1.

Witnesses
Inventor
Wm. D. Sargent

No. 629,395. Patented July 25, 1899.
W. D. SARGENT.
BEARING.
(Application filed Dec. 8, 1898.)

(No Model.) 2 Sheets—Sheet 2.

Witnesses Inventor:
Wm. M. Rheem. Wm. D. Sargent
by Raymond & Quohundro
Atty's.

UNITED STATES PATENT OFFICE.

WILLIAM DURHAM SARGENT, OF CHICAGO, ILLINOIS.

BEARING.

SPECIFICATION forming part of Letters Patent No. 629,395, dated July 25, 1899.

Application filed December 8, 1898. Serial No. 698,671. (No model.)

*To all whom it may concern:*

Be it known that I, WILLIAM DURHAM SARGENT, a citizen of the United States, residing at Chicago, in the county of Cook and State of Illinois, have invented certain new and useful Improvements in Bearings, of which the following is a specification.

My invention relates to improvements in bearings for shafts, journals, and the like in which strength, longevity, and antifrictional qualities are desirable and have heretofore been attained in greater or less degree by forming the wearing-face of the bearing of different kinds of material, so as to present a composite surface. One kind of bearing in which my invention is of especial value is car-axle-journal bearings, and it is therefore to this class of bearings that I will show my invention as specially applied. In all such bearings it is essential that in securing the desirable wearing-surface for the bearing there shall be no unnecessary sacrifice of strength, while at the same time the wearing-surface presented to the journal or shaft should remain of substantially uniform character throughout the life of the bearing.

With these ends in view the primary object of my invention is the production of a composite bearing of relatively hard and soft metals so disposed with relation to each other as to secure the maximum strength, durability, and reduction of friction and a substantially uniform wearing-surface throughout the life of the bearing. These and such other objects as may hereinafter appear are attained by the devices illustrated in the accompanying drawings, in which—

Figure 1:
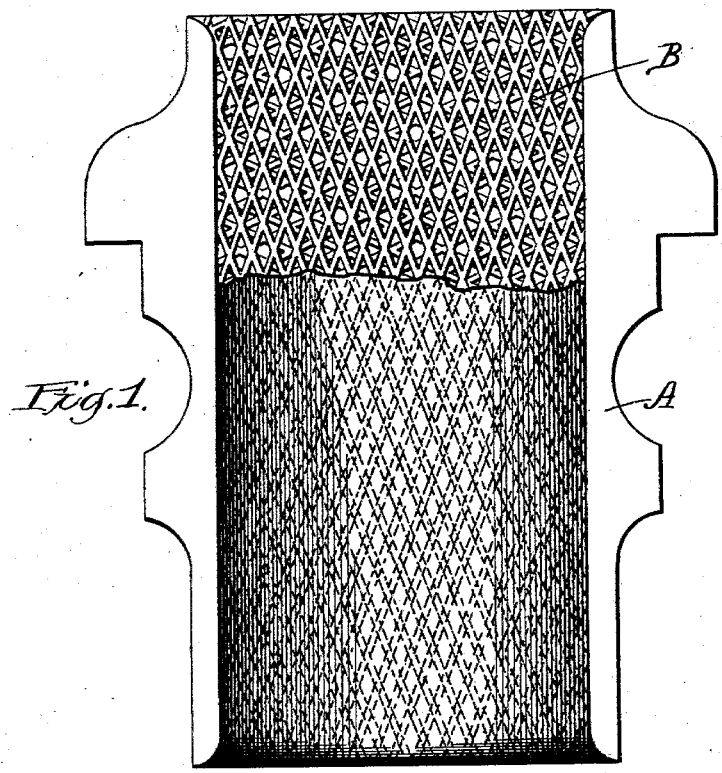
Figure 2:
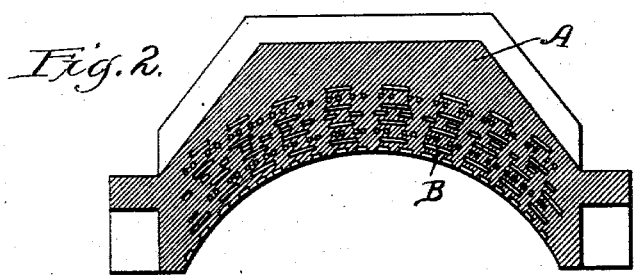
Figure 3:
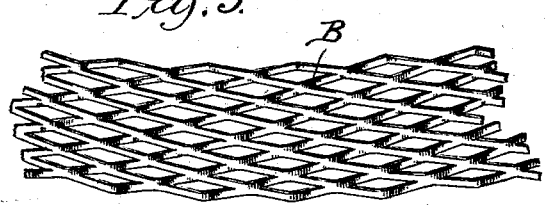
Figure 4:
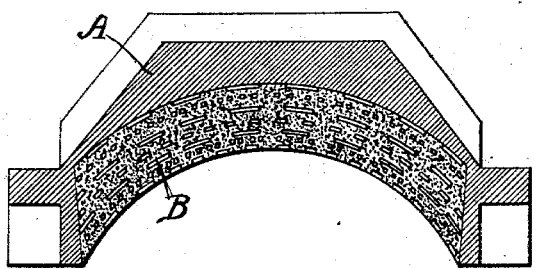

Figure 1 represents a plan view of a bearing embodying my invention. Fig. 2 represents a transverse vertical section thereof. Fig. 3 represents a detail view of the form in which one of the metals is embedded in the bearing. Fig. 4 represents a transverse vertical section through a bearing, showing a modified construction; and Fig. 5 represents a perspective view of a portion of the ductile metallic insert.

Referring by letter to the accompanying drawings, A indicates the body of the bearing, composed of cast metal of any suitable kind, and B the insert, which is designed to be embedded in the body of the bearing, being of sufficient thickness to form a proper and uniform wearing-surface during the life of the bearing. This insert is composed of wrought or ductile metal and is set in the mold and the cast metal poured around the same so as to not only embed the insert therein, but to permanently secure the same in position, so as to form a practically integral structure of the cast and ductile metal. These inserts must be of a finely-divided character— that is to say, the metal of which they are composed must be so divided and disposed as to not present a continuous surface when cut in any direction—and yet it is desirable that the insert shall be of such character that it will retain its form and assume its proper position in the body of the bearing during the casting operation. To this end I prefer to have the insert composed of what is known as "expanded metal," a sheet of which is illustrated in Fig. 3. This expanded metal is formed by taking a sheet of wrought or ductile metal and slitting it longitudinally in successive rows, the slits of one row breaking joint or occupying a staggered relation to those of the adjacent rows. When the sheet is properly slitted, the strips of metal left between the slits are drawn laterally, so as to expand the sheet of metal to considerably more than its original width, this operation also causing the alternate sides of the opening to be bent into opposite directions out of the plane of the original sheet. The result is an open-work structure somewhat like wire-netting, but composed of a single integral piece. This metal is not my invention, but is a commercial product to be found on the market and is preferred by me, because it best answers the purposes of my invention, although, of course, other forms of ductile metal in a finely-divided state might be employed instead of this particular product. I have also found it preferable to have the expanded metal composed of phosphor-bronze, which is the accepted standard for high-class bearings, giving the best service, both as to strength and longevity, while at the same time possessing the best antifrictional qualities.

Figure 5:
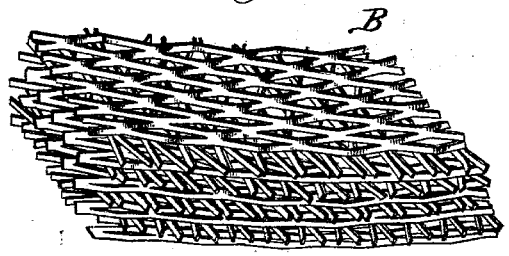

In building up an insert I take any desired number of sheets of the expanded metal and arrange them in a laminated pile, as illustrated in Fig. 5, but with the slits or openings in the strips extending practically at right angles to each other. This is plainly illustrated at the top of Fig. 1, where the top layer of expanded metal is shown as having its openings extending substantially longitudinally of the bearing, while in the layer next below the slits or openings extend transversely on the bearing, this alternate arrangement continuing throughout the pile. When this pile is built up and set in a mold, it is apparent at a glance that when the cast metal is poured thereon it must flow in all directions through the many interstices in and between the layers of the insert and will thus produce an exceedingly compact, strong, and durable structure in which all of the parts become practically integral. This arrangement also produces an excellent wearing-surface throughout the life of the bearing, and while the ductile metal of the insert is exposed only in small areas upon different points of the wearing-surface, and therefore presents a finely-divided appearance upon the wearing-surface of the bearing, at the same time it remains practically constant in the proportion or amount thereof at the wearing-surface, while each small exposed part of the ductile-metal insert continually changes in area, as well as in the position upon the surface of the bearing, because of the peculiar angular disposition of the various parts of the insert.

In Fig. 4 I have illustrated a modification of my invention in which the bearing is composed of a shell of cast metal, which may be either brass or any other kind of metal, having a chamber formed in the face thereof. In this chamber in the shell is placed an insert like that illustrated in Fig. 5, and the chamber is then filled with Babbitt metal or other like soft antifriction metal or compound which fills the interstices in and the spaces between the insert, thus making a solid body of the bearing as a whole.

In both forms of my invention herein illustrated the wearing-surface of the bearing is composed of relatively hard and soft metal, as in the one case the insert of expanded metal is softer than the cast-metal body of the bearing, while in the other case the insert is harder than the Babbitt-metal filling of the bearing; but as these inserts are necessarily composed of phosphor-bronze or some other metal possessing antifriction qualities the desirable results of my invention are attained. In the forming of the sheets of expanded metal out of the phosphor-bronze, as well as other materials, the strips between the openings are necessarily bent in both directions from the plane of the sheets, and when these sheets are laid with their strips or openings extending at substantially right angles to each other in alternate plates there is the maximum uniform distribution of the metal, and the peculiar angularity of the parts of the sheets is such that throughout the life of the bearing only small parts of each plate are ever in contact with the journal—that is, exposed upon the wearing-surface of the bearing—at any time, and this beneficial result is greatly heightened by having the openings in the successive plates disposed at right angles to each other.

Having thus fully described my invention, what I claim, and desire to secure by Letters Patent, is—

1. A bearing composed of cast metal having an insert of ductile metal of a finely-divided character, the parts of which are angularly disposed with relation to each other and to the wearing-surface of the bearing, substantially as described.

2. A bearing composed of cast metal having a ductile-metal insert embedded therein, said insert being composed of slitted sheets, the slits in which extend alternately, longitudinally and transversely of the bearing, substantially as described.

3. A bearing composed of cast metal having a ductile-metal insert embedded therein, said insert consisting of a laminated pile of sheets of expanded metal, the openings in each sheet extending at right angles to those in each adjacent sheet, substantially as described.

WILLIAM DURHAM SARGENT.

Witnesses:
C. L. WOOD,
G. Y. DANKWARD.